United States Patent [19]
Hetyei et al.

[11] Patent Number: 4,559,538
[45] Date of Patent: Dec. 17, 1985

[54] MICROWAVE LANDING SYSTEM WITH PROTECTION AGAINST JAMMING

[75] Inventors: Joseph Hetyei; Bruno Letocquart, both of Paris, France

[73] Assignee: Thomson-CSF, Paris, France

[21] Appl. No.: 417,250

[22] Filed: Sep. 13, 1982

[30] Foreign Application Priority Data

Dec. 13, 1981 [FR] France .................. 81 24576

[51] Int. Cl.[4] .......................... H01Q 3/22; G01S 1/16
[52] U.S. Cl. .................................... 343/412; 343/372
[58] Field of Search ............... 343/372, 374, 408, 412, 343/754, 777, 778, 893

[56] References Cited

U.S. PATENT DOCUMENTS

| | | | |
|---|---|---|---|
| 3,435,453 | 3/1969 | Howard | 343/778 X |
| 3,683,374 | 8/1972 | Honold | 343/372 X |
| 3,953,853 | 4/1976 | Carter et al. | 343/374 |
| 3,964,066 | 6/1976 | Nemit | 343/374 X |
| 4,178,581 | 12/1979 | Willey, Sr. | 343/408 |
| 4,232,316 | 11/1980 | Chaki et al. | 343/412 |
| 4,257,050 | 3/1981 | Ploussius | 343/374 |
| 4,358,768 | 11/1982 | Ernst et al. | 343/408 X |
| 4,378,559 | 3/1983 | Rittenbach | 343/374 |

OTHER PUBLICATIONS

B. Letoquart and J. M. Skrzypczak, "LeMLS, Unexample d'utilisation du Microprocesseur", *Navigation*, vol. 29, No. 114, (Paris) Apr., 1981.
B. Letoquart, "The MLS in France "Microwave Journal, May 1981, pp. 113–120.

*Primary Examiner*—Charles T. Jordan
*Assistant Examiner*—Brian S. Steinberger
*Attorney, Agent, or Firm*—Pollock, Vande Sande & Priddy

[57] ABSTRACT

In a microwave landing system or MLS, the bearing and/or elevation angular messages are in two parts a preamble transmitted by a sector antenna and a specific message transmitted by an electronic scan or scanning beam antenna. As the gain of the sector antenna is below that of the scanning beam antenna, the preamble is much more vulnerable to scanning than the message.

According to the invention, a preamble is transmitted, which is reinforced in a narrow angular sector and movable so as to cover the sector covered by the sector antenna by superimposing the radiation patterns of the sector antenna and the scanning beam antenna in said direction.

8 Claims, 6 Drawing Figures

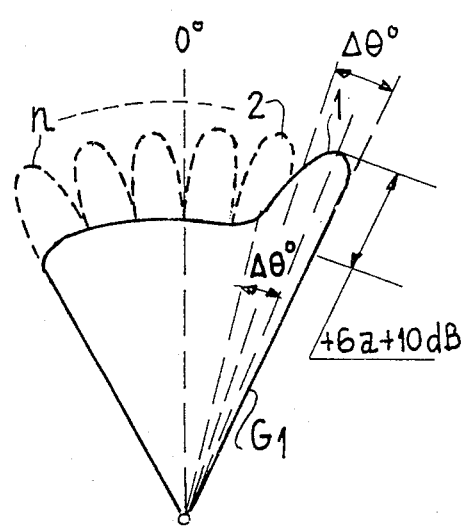
FIG_1
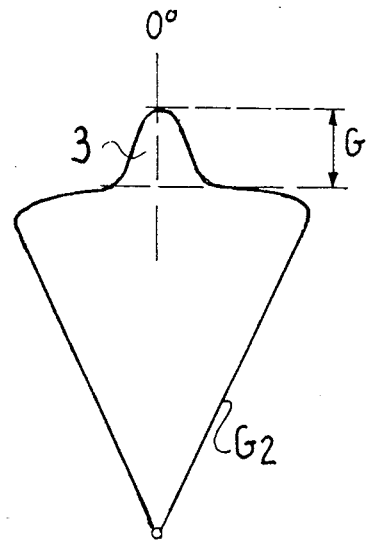
FIG_2
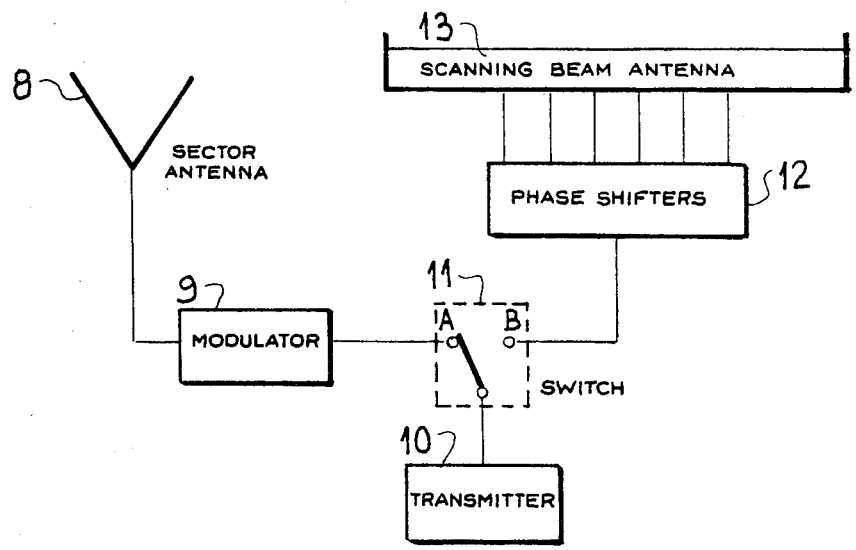
FIG_3

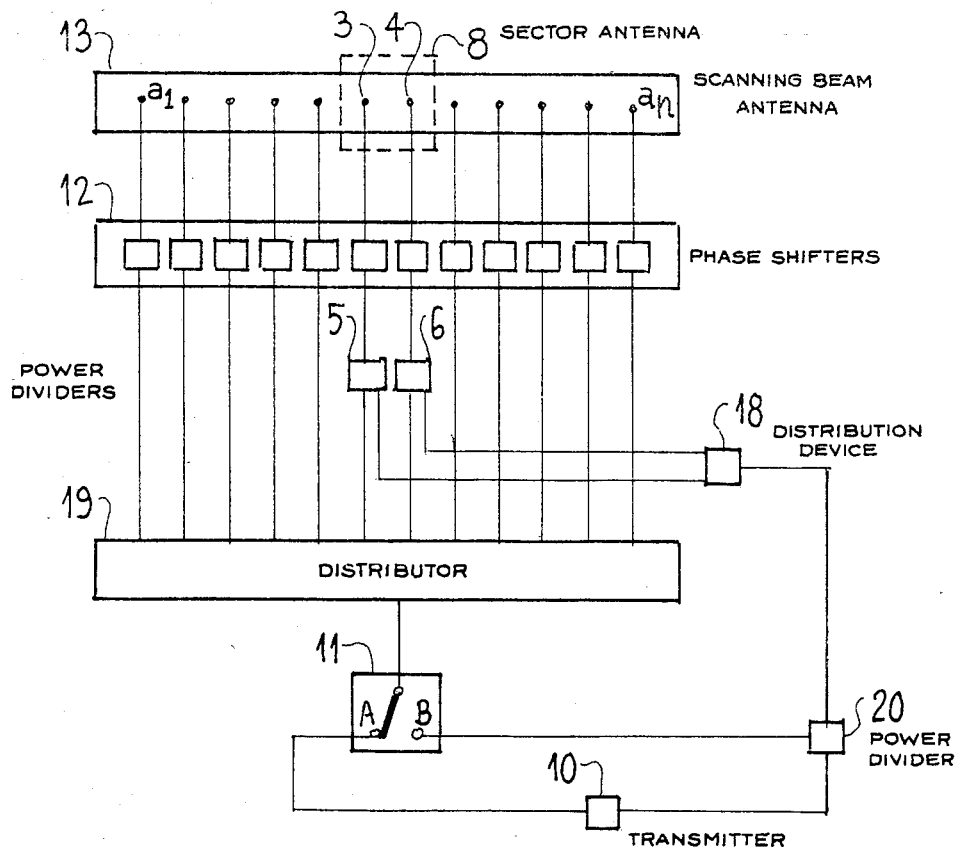
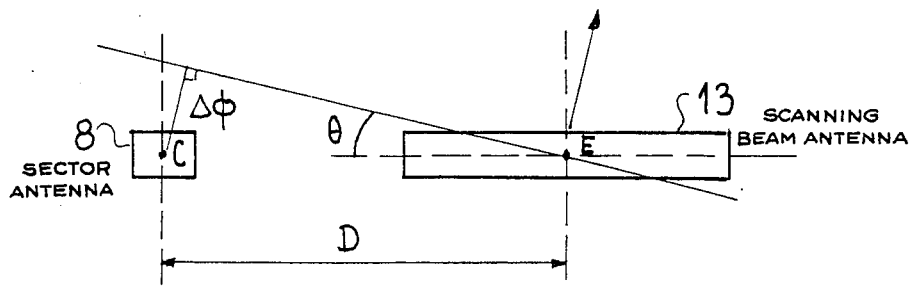

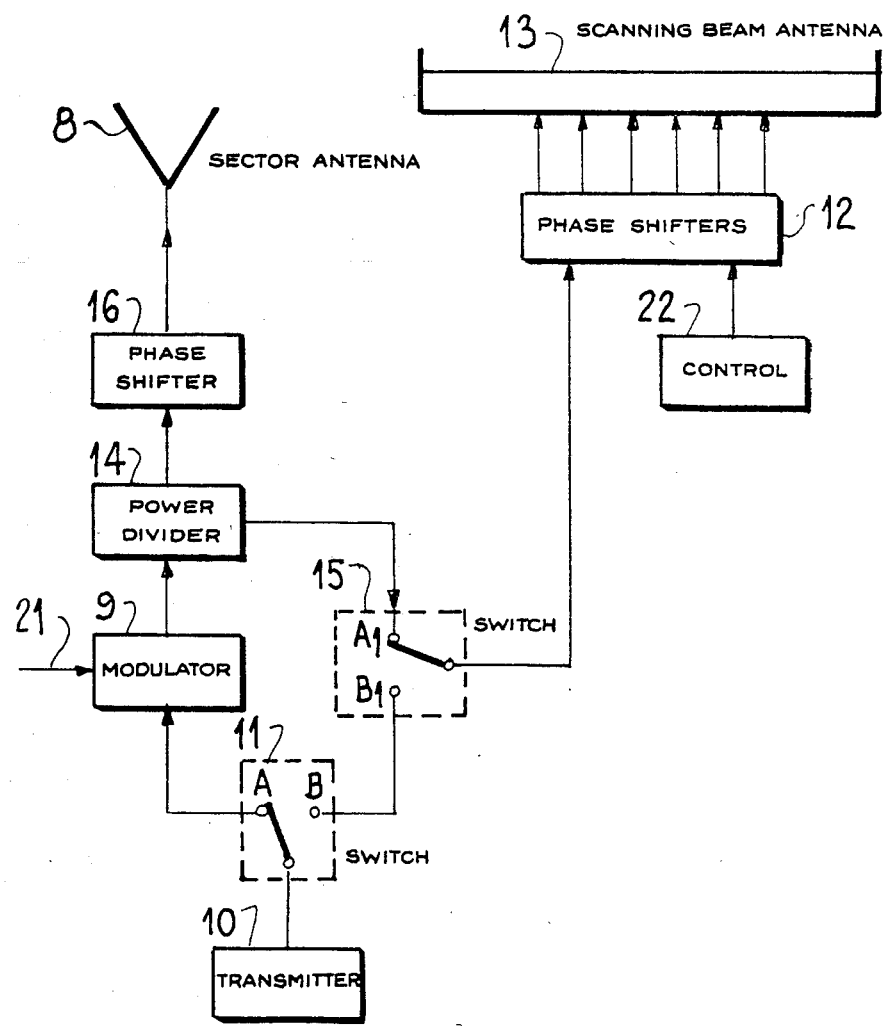

MICROWAVE LANDING SYSTEM WITH PROTECTION AGAINST JAMMING

BACKGROUND OF THE INVENTION

The present invention relates to a microwave landing system which is protected against jamming.

Before describing the subject matter of the invention, it would appear advisable to describe a microwave landing system (MLS), which is increasingly being used in place of conventional instrument landing systems. Although the latter are widely used throughout the world, they are increasing being found unable to meet the needs of modern aviation, despite the improvements made to them.

A microwave landing system supplies the aircraft with all the information necessary for determining its position relative to the runway in the form of a bearing angle and an elevation angle, together with its distance, the latter being given by an associated distance measurement equipment (DME). The MLS is said to be anametric, because the measurement is performed on-board the aircraft on the basis of information transmitted by the ground MLS station, whose transmission is intended for all aircraft within its coverage. Each aircraft determines its own position on the basis of information transmitted by the station and without entering into bilateral communication with it.

A group MLS installation generally comprises two ground stations, one transmitting a bearing message and the other transmitting an elevation message, a third DME station supplying the distance message. However, throughout the remainder of this text, no mention will be made of the latter station. In addition, no reference will be made to the equipment on board the aircraft, which utilizes the information transmitted by the ground MLS stations. On the basis of this information, the aircraft determines its angular position (bearing and elevation) and its distance from the axis and from a given reference point of the runway.

In principle, a ground elevation and/or bearing angle measurement is performed on the basis of an antenna producing a narrow fan-shaped beam, which scans the angular section of the MLS coverage and the angular position of the aircraft is determined by the outward and return scan of the beam, by measuring the time interval between two pulses received by the aircraft, one for each passage of the beam. The MLS ensures a certain number of functions, but hereinafter significance will only be attached to the bearing and elevation functions. The latter functions, together with the other functions, are transmitted on a time sharing basis. Transmission takes place on a single carrier frequency allocated to the angular station. The angular measurement part, scanning of the beam, is carried out without modulation of the carrier and data transmission takes place in DPSK modulation, modulation by differential phase.

In a MLS system, the transmission relative to a function always starts by a preamble transmitted by a sector coverage antenna, covering the complete MLS volume. This preamble ensures the synchronization of the onboard measuring sequence and gives the identity of the following angular function, i.e. elevation or bearing The transmission of the preamble is thus followed by the transmission of the outward and return scans of the scanning beam produced, in the manner described hereinbefore, by an electronic scanning antenna, the measurement on board the aircraft of the time which has elapsed between two successive passages of the beam striking the aircraft permitting the angular measurement.

A more detailed description of the aforementioned MLS is given in the two following articles:
le MLS, un exemple d'utilisation du microprocesseur de B. Létoquart and J.M. Skrzypczak which was published in the Review "Navigation", April 1981;
the MLS in France, published in the Review "Microwave Journal", May 1981, pp. 113 to 120.

However, in connection with the operating phase of the MLS relating to the transmission of the preamble and then of the angular function, that the sector antenna transmitting the preamble of the function and covering the proportional scan sector has a gain lower that that of the scanning beam antenna. In the case of system jamming, this gain difference between the antennas makes the preamble more vulnerable than the angular measurement signals.

BRIEF SUMMARY OF THE INVENTION

The object of the present invention is to reduce this vulnerability to jamming of the MLS and more specifically the preamble of the considered function. The present invention therefore relates to a microwave landing system or MLS, which is protected against jamming, in which the transmitted signals comprise a preamble part and a specific angular message part, namely elevation or bearing, transmitted separately in different diagrams, wherein to escape from jamming, the preamble is transmitted in a reinforced diagram having a gain which is higher than that of the diagram transmitting it normally.

BRIEF DESCRIPTION OF THE DRAWINGS

The invention is described in greater detail hereinafter relative to non-limitative embodiments and the attached drawings, wherein show: FIG. 1 a directional diagram reinforced in a given direction. FIG. 2 a directional diagram reinforced in the bearing axis direction. FIG. 3 a prior art block diagram of the supply of the antennas in a MLS. FIG. 4 a block diagram of the supply of the antennas of a MLS according to the invention, when the phase centres of the two antennas coincide. FIG. 5 a block diagram of two antennas, when their phase centres do not coincide. FIG. 6 a block diagram of the supply of the antennas according to the invention with phasing of the directional diagrams in the selected direction.

DETAILED DESCRIPTION OF THE PREFERRED EMBODIMENTS

The elements carrying the same references in the different drawings ensure the same functions with a view to achieving the same results.

It has been stated in the introduction that in the MLS system, which is intended to replace the ILS system, angular messages are transmitted with a format such that they comprise a preamble indicating the identity of the specific angular message which follows, as well as a specific message. One of the remarkable characteristics of the MLS is that the preamble is transmitted by a sector antenna, whilst the specific message is transmitted by an electronic scan antenna, called a scanning beam antenna.

In view of the width of the sector covered by the antenna transmitting the preamble compared with the narrow sector covered by the fan-shaped beam transmitted by the scanning beam antenna, it is obvious that the gain of the sector antenna is lower than that of the scanning beam antenna. It can easily be demonstrated that the 3 dB width of the scanning beam antenna being 4° to 1°, whereas the e.g. bearing sector antenna has a beam width of approximately 80° (±40°), the gain difference between the second antenna and the scanning beam antenna is 7 to 15 dB. The narrower the beam of the electronic scan, the higher the gain of its antenna. The theoretical gain found is obviously reduced by the various losses which can occur between the transmitter output and the electronic scan antenna and with respect to various components thereof, e.g. power dividers, phase shifters, etc. Thus, under these conditions for a given beam width of e.g. 3°, the peak power emitted in this way by the scanning beam is 10 dB higher than the peak power emitted by the sector antenna.

As stated hereinbefore, this gain difference between the two antennas of the MLS is of great importance in the case of jamming. The preamble transmitted by the sector antenna is much more vulnerable than the signal transmitted by the scanning beam. Thus, the preamble transmitted in DPSK modulation in accordance with the words chosen in the ICAO format tolerates no decoding error, the error on 1 bit making the message unusable. Thus, on reception, a signal-to-jamming ratio equal to or above 6 dB is necessary.

Thus, scanning can be carried out either by a continuous transmission for which the signal-to-jamming ratio is below 6 dB, or by pulses having a width of approximately 100 μs and an appropriate repetition frequency of approximately 1000 Hz is able to prevent decoding of the preamble and consequently the decoding of the basic data and auxiliary data transmitted by the sector antenna.

According to the invention, this jamming vulnerability of the preamble is reduced by reinforcing the preamble which will be transmitted before each bearing or elevation angular scan, for the acquisition of the angular measurement. The reinforced transmission of this preamble is ensured in a given sector, which can be approximately 3° to 6°, by a modification of the radiation pattern of the sector antenna in order to ensure in the given sector a gain of approximately 6 to 10 dB higher than the gain in the remainder of the pattern. In this way, the reception of the preamble for the aircraft in the reinforced part 1 to n of the pattern is ensured with a gain of +8 to +10 dB, whereas in the remainder of the sector reception of the preamble takes place with the normal gain of the sector antenna.

According to the invention, such a reinforced diagram or pattern, for the transmission of the resulting reinforced preamble, is brought about by the simultaneous use of the sector antenna and the scanning beam antenna.

In this way, the radiation patterns of the antennas in question are superimposed in the direction in which it is desired to transmit a reinforced preamble. According to the invention, this reinforced diagram or pattern is in fact the reinforced part of the radiation pattern of the sector antenna and is successively pointed in different directions prior to the transmission of the preamble of the angular function, so as to ensure the complete coverage in bearing or elevation of the complete sector in question. Thus, during a sequence of transmissions by the MLS station, the preamble is on each occasion reinforced in a different direction. In the same way, the reception of the reinforced preamble is ensured for each aircraft located in the sector coverage of the MLS system, whereby this is in sequential manner. In other words, according to the invention, the transmission of the preamble takes place with a gain increase of approximately 6 to 10 dB in clearly defined directions which successively cover the complete MLS sector.

FIG. 1 shows the reinforced diagram of the sector antenna. As can be gathered from the preceding description, the reinforcement appears in a relatively narrow sector of $\Delta\theta°$ designated 1, e.g. in a bearing angle of 20° compared with the original bearing 0°. The dotted lines indicate the reinforcements 2 ... n obtained for the successive pointing directions until the complete MLS coverage is covered.

FIG. 2 shows the reinforced diagram for angular position 0°. It is apparent from the diagrams of FIGS. 1 and 2 that the narrow sector of width $\Delta\theta°$ corresponding to the width of the reinforced lobe is mobile and the maximum gain which can be obtained for each reinforcement has to be obtained by successive steps throughout the sector coverage. Thus, the reinforced part is directed in a direction differing by $\Delta\theta°$ from its preceding position before starting each angular scan.

Different solutions will be given hereinafter making it possible to realise the desired reinforced directional diagram.

Using the two antennas existing in MLS, it appeared useful to give in FIG. 3 a representation of the supply of such antennas in accordance with the prior art. The sector antenna 8 is connected to a DPSK modulator 9 and to MLS transmitter 10 across switch 11 by its terminal A. Terminal B of switch 11 is connected to phase shifters 12 associated with the scanning beam antenna 13. The sector antenna 8 transmits the preamble, whilst the electronic scan antenna 13 transmits the angular message. According to the prior art, these two antennas are alternately supplied by MLS transmitter 10 via switch 11.

According to the invention, to bring about the desired diagram form, the two antennas are simultaneously supplied during the transmission of the preamble and then only the scanning beam antenna performs the angular transmission. It should be noted that for carrying out a summation of two directional diagrams, it is necessary to summate them in phase in the area in which they overlap.

FIG. 4 diagrammatically shows a first embodiment making it possible to superimpose the diagrams of sector antenna 8 and the scanning beam antenna in the case where the phase centres of the antennas coincide.

In this case, the scanning beam antenna is represented by 13 with its elementary antennas $a_1$ to $a_n$. The two elementary antennas 3 and 4 are used for producing the radiation pattern of the sector antenna whilst continuing to fulfill their function in the scanning beam antenna. At 12 is provided the group of phase shifters associated with the elementary antennas $a_1$ to $a_n$. At 19, is provided the energy distributor associated with the scanning beam antenna 13, which is connected by terminal A of switch 11 to MLS transmitter 10. As stated hereinbefore, sector antenna 8 comprises two elementary antennas 3, 4 in the central position. These two elementary antennas are connected across the associated respective phase shifters to power dividers 5, 6, connected on the one hand to distributor 19 and on the other to a distribution device 18 connected to the MLS transmitter via a power divider 20.

As a function of the position of switch 11, MLS transmitter 10 supplies either the scanning beam and sector antennas together when it is in position B realising the superimposing of the radiation patterns of the two antennas for the transmission of the preamble, or only the scanning beam antenna when it is in position A.

FIG. 5 shows a second embodiment of the antenna according to the invention, when the phase centres of the two antennas do not coincide. The phase centres E and C are separated by a distance D, so it is necessary to envisage a phase displacement $\Delta\phi$ to be added, in the present case to sector antenna 8. This phase displacement $\Delta\phi$ is $2\pi D/\lambda \sin\theta$, with $\theta$ giving the reinforced pointing direction. It is also possible to omit the phase displacement $\Delta\phi$ from the electronic scan antenna 13.

FIG. 6 gives the complete diagram in the case when the phase centres are separated. The MLS transmitter 10 supplies the DPSK modulator 9 across a switch 11 by its terminal A. This modulator controlled by control 21 is connected to a power divider 14, which is directly connected to a phase shifter 16, connected to sector antenna 8. Terminal B of switch 11 is connected to terminal B1 of a second switch 15, whose terminal A1 is connected to power divider 14. Switch 15 enables the power divider 14 to direct part of the energy from transmitter 10 to the electronic scanning antenna 13 across phase shifters 12 controlled by control 22, which acts on the pointing of the diagram. This control can be constituted by a programmable read-only memory (PROM) containing the different digitized positions. When both of the switches 11 and 15 are on terminals B, B1 respectively, MLS transmitter 10 is directly connected to antenna 13 ensuring the transmission of the message part. Conversely, when the switches are on their terminals A, A1 respectively, the MLS transmitter simultaneously supplies the sector antenna and the electronic scanning antenna, ensuring the formation of a reinforced diagram.

The phase shifters 12 associated with the electronic scan antenna 13 are put into position by the so-called sector pointing control 22 in such a way that the antenna is directed in the direction where it is desired to have a reinforced sector diagram transmitting the reinforced preamble. This pointing direction is displaced by an angle $\theta$ equal to the width of the scanning beam prior to the transmission of a new preamble. This displacement is brought about by modifying the control of phase shifters 12. Phase shifter 16 inserted between the output of power divider 14 and sector antenna 8 serves to modify the MLS signal at the input of antenna 8 in order to modify its phase in such a way that antennas 8 and 13 transmit in phase in the chosen pointing direction $\theta$.

According to a variant, it is possible to eliminate phase shifters 16 and add phase $\Delta\phi$ to all the phase shifters of assembly 12 by means of a not shown or described control logic.

Thus, a microwave landing system has been described which has reinforced protection against jamming, which more particularly affects the preamble.

It should be noted, and this is quite normal and acceptable, that the system according to the invention only functions when the peak power of the jammer received on board the aircraft remains a few dB below the power of the angular pulses, the acquisition and verification of the validation of a measurement always being based on the criterion that the useful pulse must have the largest amplitude from among the pulses received during the scanning time of the scanning beam.

It should also be noted that the power necessary for jamming the angular message transmitted by the scanning beam antenna is not changed. Thus, when this power is available, the protected system requires the jammer to move to a certain distance from the MLS system, whereas the unprotected system can be jammed by means of its preamble on the basis of double or triple the distance.

It should be noted that the protected system remains usable by standardized receivers in the case of non-jamming and makes it possible to continue the angular measurement with adequate receivers in the case of interference with the preambles. Therefore, the non-reinforced preamble remains available in the entire sector covered by the sector antenna.

It should also be noted that in the case of a MLS transmission performed according to the invention in the case of jamming, the aircraft does not receive the preamble information on a regular basis before each angular scan. This information is in fact only received when the aircraft is in the reinforced beam transmitting the preamble.

In order to permit the angular measurement without systematic reception of the preamble, which occurs when at the time of the following transmission, e.g. of the reinforced preamble in a direction modified compared with the preceding direction, the aircraft is not in the reinforced part of the diagram, the transmission of the sequences of the ground transmitters transmitting the bearing and elevation information must be regular and predetermined and the reinforced preamble contains all the information necessary for identifying the transmission sequences of period $T+f(t)$, $f(t)$ being known as jitter and representing a time interval, which is a periodic function of the increasing and decreasing time, such as a sinusoidal function. This jitter makes it possible to prevent synchronous multipaths, which are very often due to the rotation of aircraft propellers or helicopter blades. By decoding the preamble which is received, the aircraft has information on the function which it is going to receive and of its position in the transmitted sequences. In the absence of the preamble, the aircraft can continue the angular measurement subsequently or more accurately between receptions or reinforced preambles.

We claim:

1. A microwave landing system comprising two ground stations, transmitting respectively angular messages of azimuth and elevation, each angular message being constituted by a preamble followed by an angular function, each station comprising:

a sector antenna transmitting said preamble of said angular function;

a scanning beam antenna transmitting said angular function and having a gain higher that the sector antenna gain;

means for superimposing, in phase, the radiation pattern of said sector antenna and the radiation pattern of said scanning beam antenna, the latter pointed in a predetermined direction during the entire transmission of said preamble and the superposition of radiation patterns occurring successively in several chosen directions which in their entirety cover the complete sector radiation pattern, so as to reinforce the gain, in a given sector, of the sector radiation pattern of said sector antenna with regards to the normal gain of said sector pattern.

2. A landing system as claimed in claim 1, wherein the phase centers of said sector and scanning beam antennas are separated, and said superimposing means including phase shifting circuits for adding a phase shift $\Delta\theta$ to one of said antennas or by subtracting the same phase shift from said other antenna whereby the phasing of the radiation patterns of the antennas can be obtained therefrom, for a particular reinforcement pointing direction of the sector pattern.

3. A landing system as claimed in claim 2, together with a power divider connected to a transmitter of the system for supplying part of the transmission power to said sector antenna and the remainder to said scanning beam antenna via said phase shifting circuits, and a control device connected to said phase shifting circuits for determining the successive pointing directions of the scanning beam antenna beam in which the pattern of said sector antenna is reinforced.

4. A landing system as claimed in claim 3 together with:
a first switch having a first position for connecting the transmitter to a modulating circuit for generating said preamble of the signals to be transmitted;
means connecting the output of the modulator to a power divider, a first output of which provides modulated power to the sector antenna;
a second switch having a first position for connecting a second output of the power divider to the scanning beam antenna via phase shifting means.

5. The landing system in claim 4 wherein the first and second switches located in their respective first positions enable simultaneous connection of the transmitter with the sector and scanning beam antennas thereby superimposing the radiation patterns of both antennas.

6. A landing system as claimed in claim 5 together with a phase shifter connected between said power divider and said sector antenna modifying by $\Delta\theta$ the phase of the signal applied to said sector antenna so that said sector antenna and scanning beam antenna transmit in phase.

7. A landing system as claimed in claim 6, wherein said phase shifter and said phase shifting means receiving from said modulating circuit a phase displacement $-\Delta\theta$ so as said sector antenna and said scanning beam antenna radiate in phase.

8. A landing system as claimed in claim 1, wherein said sector antenna comprises two elementary antennas located in the center of said scanning beam antenna so as their phase centers coincide, said two elementary antennas being connected, via first and second power dividers, to the transmitter of the system and using two separate supply circuits, one incorporating a switch and an energy distributor associated with said scanning beam antenna, and the other incorporating a third power divider and a distributor connected to the first two power dividers associated with said sector antenna, said switch connected in a preselected position to the third power divider thereby simultaneously supplying two antennas.

* * * * *